United States Patent
Tong et al.

(10) Patent No.: US 12,394,179 B2
(45) Date of Patent: Aug. 19, 2025

(54) PERFORMING VANE CLASSIFICATION FOR TURBINE ENGINES USING STRUCTURED LIGHT THREE-DIMENSIONAL (3D) SCANS

(71) Applicant: RTX Corporation, Farmington, CT (US)

(72) Inventors: Kun Tong, West Hartford, CT (US); Tracy A. Propheter-Hinckley, Rocky Hill, CT (US); Venumadhava Ponnala, East Hampton, CT (US); Andres Diaz Alvarado, Humacao, PR (US)

(73) Assignee: RTX CORPORATION, Farmington, CT (US)

( * ) Notice: Subject to any disclaimer, the term of this patent is extended or adjusted under 35 U.S.C. 154(b) by 354 days.

(21) Appl. No.: 17/877,712

(22) Filed: Jul. 29, 2022

(65) Prior Publication Data
US 2024/0037909 A1   Feb. 1, 2024

(51) Int. Cl.
| | | |
|---|---|---|
| *G06V 10/764* | (2022.01) | |
| *F01D 9/02* | (2006.01) | |
| *G06T 7/521* | (2017.01) | |
| *G06T 17/20* | (2006.01) | |

(52) U.S. Cl.
CPC .......... *G06V 10/764* (2022.01); *F01D 9/02* (2013.01); *G06T 7/521* (2017.01); *G06T 17/20* (2013.01); *F05D 2220/323* (2013.01); *F05D 2240/12* (2013.01); *F05D 2250/20* (2013.01);
(Continued)

(58) Field of Classification Search
CPC .................................................. F05D 2250/20
See application file for complete search history.

(56) References Cited

U.S. PATENT DOCUMENTS

| | | | | |
|---|---|---|---|---|
| 8,578,581 | B2 * | 11/2013 | Bellerose | ........... G05B 19/4097 |
| | | | | 29/557 |
| 9,704,293 | B2 * | 7/2017 | Date | ..................... G06T 17/205 |
| 9,733,195 | B2 | 8/2017 | Colletti | |

(Continued)

FOREIGN PATENT DOCUMENTS

| | | |
|---|---|---|
| CN | 105737762 B | 3/2018 |
| CN | 105333855 B | 10/2018 |

(Continued)

OTHER PUBLICATIONS

EP Search Report dated Jul. 19, 2023; EP Application No. 23175879.8; 12 pages.

*Primary Examiner* — Courtney D Heinle
*Assistant Examiner* — Danielle M. Christensen
(74) *Attorney, Agent, or Firm* — CANTOR COLBURN LLP

(57) ABSTRACT

An example method for vane classification includes scanning, using a structured light scanner, a vane for a turbine engine to capture three-dimensional (3D) data about the vane. The method further includes generating a point cloud from the 3D data about the vane. The method further includes connecting, using a processing system, points of the point cloud to generate a mesh surface. The method further includes determining, using the processing system, an airflow for an airfoil of the vane based at least in part on the mesh surface. The method further includes constructing the turbine engine based at least in part on the airflow for the airfoil of the vane without reference to an adjacent airfoil of the vane.

15 Claims, 9 Drawing Sheets

(52) U.S. Cl.
CPC .............. *G06T 2207/10028* (2013.01); *G06T 2207/30164* (2013.01)

(56) References Cited

U.S. PATENT DOCUMENTS

| | | |
|---|---|---|
| 10,024,760 B2 | 7/2018 | Bojappa et al. |
| 10,295,436 B2 | 5/2019 | Conner et al. |
| 11,003,806 B2 * | 5/2021 | Burkett .................. G06F 30/17 |
| 11,250,189 B1 | 2/2022 | Clark et al. |
| 2019/0391559 A1 | 12/2019 | Auxier et al. |
| 2020/0173936 A1 | 6/2020 | Vöhringer et al. |

FOREIGN PATENT DOCUMENTS

| | | |
|---|---|---|
| CN | 111612768 A | 9/2020 |
| EP | 1760427 A2 | 3/2007 |
| EP | 3168808 A1 | 5/2017 |
| EP | 3192978 A2 | 7/2017 |
| EP | 3591173 A1 | 1/2020 |
| WO | 2014052209 A1 | 4/2014 |

\* cited by examiner

PERFORMING VANE CLASSIFICATION FOR TURBINE ENGINES USING STRUCTURED LIGHT THREE-DIMENSIONAL (3D) SCANS

STATEMENT OF FEDERAL SUPPORT

This invention was made with Government support under Contract FA8626-21-D-0001, Order FA8626-21-F-0033 awarded by the United States Air Force. The Government has certain rights in this invention.

BACKGROUND

The subject matter disclosed herein generally relates to vane classification for turbine engines.

Turbine engines, such as gas turbine engines and hybrid electric turbine engines, use vanes to direct air within the engines. Turbine vanes direct and meter the hot combustion gasses onto turbine blades which spin to create rotational motion that is transferred to other turbine components such as a fan and/or compressor to create thrust and/or power. The direction and the amount of hot gas flow presented to a blade from the preceding vane can be directly correlated to the efficiency by which rotational energy can be extracted from the hot gas path flow. It is therefore useful to analyze vanes based on their airflow characteristics.

BRIEF DESCRIPTION

In one exemplary embodiment, a computer-implemented method for vane classification is provided. The method includes scanning, using a structured light scanner, a vane for a turbine engine to capture three-dimensional (3D) data about the vane. The method further includes generating a point cloud from the 3D data about the vane. The method further includes connecting, using a processing system, points of the point cloud to generate a mesh surface. The method further includes determining, using the processing system, an airflow for an airfoil of the vane based at least in part on the mesh surface. The method further includes constructing the turbine engine based at least in part on the airflow for the airfoil of the vane without reference to an adjacent airfoil of the vane.

In addition to one or more of the features described herein, or as an alternative, further embodiments of the method may include that the structured light scanner is a blue light structured light scanner.

In addition to one or more of the features described herein, or as an alternative, further embodiments of the method may include that the mesh surface is a triangle mesh.

In addition to one or more of the features described herein, or as an alternative, further embodiments of the method may include that the mesh surface is a polygon mesh.

In addition to one or more of the features described herein, or as an alternative, further embodiments of the method may include that the airflow is determined based at least in part on an amount of air flow blockage of the vane.

In addition to one or more of the features described herein, or as an alternative, further embodiments of the method may include that the airflow is determined based at least in part on a rotational angle of the vane.

In addition to one or more of the features described herein, or as an alternative, further embodiments of the method may include that constructing the turbine engine is further based at least in part on the airflow of a plurality of other airfoils.

In another exemplary embodiment a system includes a structured light scanner to scan a vane for a turbine engine to capture three-dimensional (3D) data about an airfoil of the vane. The system further includes a processing system. The processing system includes a memory having computer readable instructions and a processing device for executing the computer readable instructions. The computer readable instructions control the processing device to perform operations for vane classification. The operations include generating a point cloud from the 3D data about the airfoil of the vane. The operations further include connecting points of the point cloud to generate a mesh surface. The operations further include determining an airflow for the airfoil of the vane based at least in part on the mesh surface. The operations further include causing the turbine engine to be constructed based at least in part on the airflow for the airfoil for the vane without reference to an adjacent airfoil of the vane.

In addition to one or more of the features described herein, or as an alternative, further embodiments of the system may include that the structured light scanner is a blue light structured light scanner.

In addition to one or more of the features described herein, or as an alternative, further embodiments of the system may include that the mesh surface is a triangle mesh.

In addition to one or more of the features described herein, or as an alternative, further embodiments of the system may include that the mesh surface is a polygon mesh.

In addition to one or more of the features described herein, or as an alternative, further embodiments of the system may include that the airflow is determined based at least in part on an amount of air flow blockage of the vane.

In addition to one or more of the features described herein, or as an alternative, further embodiments of the system may include that the airflow is determined based at least in part on a rotational angle of the vane.

In addition to one or more of the features described herein, or as an alternative, further embodiments of the system may include that constructing the turbine engine is further based at least in part on the airflow of a plurality of other vanes.

In addition to one or more of the features described herein, or as an alternative, further embodiments of the system may include that the structured light scanner scans a gas path of the turbine engine for a window height, wherein determining the airflow for the airfoil of the vane is based at least in part on the window height.

In yet another exemplary embodiment a computer program product includes a computer readable storage medium having program instructions embodied therewith, the program instructions executable by a processor to cause the processor to perform operations. The operations include receiving, from a structured light scanner, three-dimensional (3D) data about an airfoil and a gas path of a vane for a turbine engine. The operations further include generating a point cloud from the 3D data about the airfoil and the gas path of the vane. The operations further include connecting, using a processing system, points of the point cloud to generate a mesh surface. The operations further include determining, using the processing system, an airflow for the airfoil of the vane based at least in part on the mesh surface. The operations further include causing the turbine engine to be constructed based at least in part on the airflow for the airfoil of the vane without reference to an adjacent airfoil of the vane.

In addition to one or more of the features described herein, or as an alternative, further embodiments of the computer program product may include that the structured light scanner is a blue light structured light scanner.

In addition to one or more of the features described herein, or as an alternative, further embodiments of the computer program product may include that the mesh surface is a polygon mesh.

In addition to one or more of the features described herein, or as an alternative, further embodiments of the computer program product may include that the airflow is determined based at least in part on an amount of air flow blockage of the vane.

In addition to one or more of the features described herein, or as an alternative, further embodiments of the computer program product may include that the airflow is determined based at least in part on a rotational angle of the vane.

The above features and advantages, and other features and advantages, of the disclosure are readily apparent from the following detailed description when taken in connection with the accompanying drawings.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
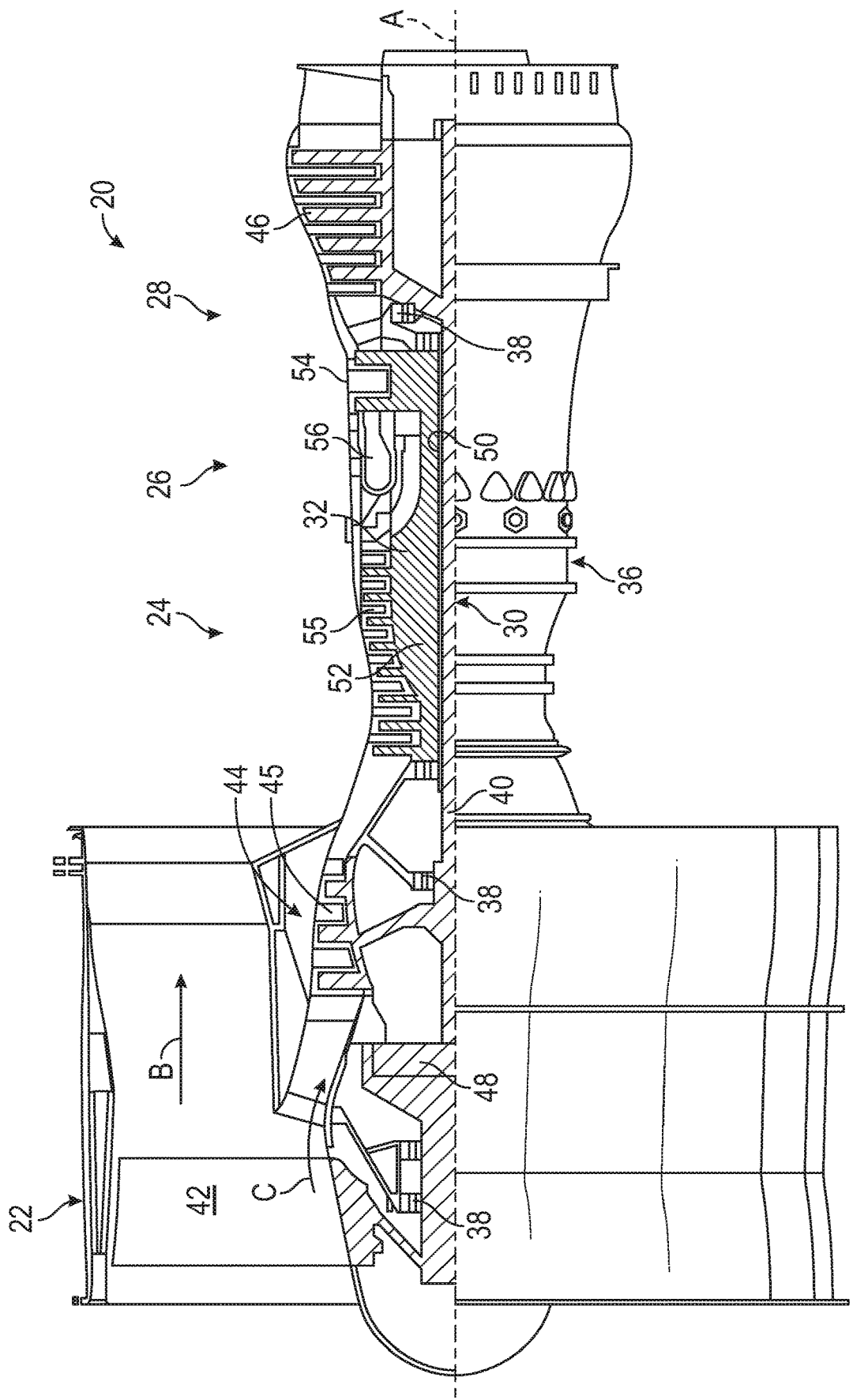
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. In some embodiments, stator vanes 45 in the low pressure compressor 44 and stator vanes 55 in the high pressure compressor 52 may be adjustable during operation of the gas turbine engine 20 to support various operating conditions. In other embodiments, the stator vanes 45, 55 may be held in a fixed position. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 m/sec).

While the example of FIG. 1 illustrates one example of the gas turbine engine 20, it will be understood that any number of spools, inclusion or omission of the gear system 48, and/or other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

As described, the gas turbine engine 20 can include one or more vanes, such as the stator vanes 45, 55, guide inlet vanes, fan exit guide vanes, compressor vanes, turbine vanes, and/or the like, including combinations and/or multiples thereof. When the vanes are being manufactured, it may be desirable to perform vane classification to determine an airflow for each vane. Each vane, even of the same design, can be different in terms of airflow due to variations in manufacturing, materials, etc. It is useful to analyze each vane when assembling a gas turbine engine to determine how each vane's airflow contributes to the airflow of a full ring of vanes at a given stage of the turbine. This analysis eliminates vanes that are out of tolerance in terms of airflow.

The aerodynamic efficiency of a turbine is dependent on how efficiently energy can be extracted from combustion gasses by the turbine blades. For turbine blades to efficiently extract energy from those gasses, the amount and direction of combustion gas flow onto the blades should be within prescribed tolerances. These two parameters, amount and direction of flow, are determined by the aerodynamic shape of turbine vanes. It is therefore useful to analyze vanes based on their airflow characteristics. The analysis of the amount of flow is further described herein and may be referred to as "vane classification." A conventional approach to vane classification includes performing unique part specific hard gage classification. However, hard gage classification is difficult to maintain and needs periodic calibration to perform accurately due to the delicate nature of the system used. Another conventional approach to vane classification includes using a coordinate measuring machine (CMM). However, CMM vane classification requires unique part specific fixtures, complex programming, and only returns discrete points on the surface of the vane. Moreover, conventional techniques tend to analyze vane assemblies (that is, assemblies of multiple vanes) as a whole and not on an individual airfoil-by-airfoil basis.

One or more embodiments described herein address these and other shortcomings by providing for performing vane classification using structured light three-dimensional (3D) scans. A structured light 3D scanner is used to measure the 3D shape of an object (e.g., a vane) by projecting a light pattern onto surfaces of the object and then capturing one or more images of the object while the light pattern is projected on to the object. Stitching images taken from different orientations enables a full 3D geometry to be captured according to one or more embodiments. The results are a collection of 3D points, referred to as "scans." The scans can be digitally aligned to a model, such as a computer aided design (CAD) model. According to one or more embodiments described herein, virtual touch edges and touch disks on the structured light scan can be used to simulate hard gage pins to identify surface high points, which can be used to extract dimensions for vane classification.

According to one or more embodiments described herein, a structured light scanner captures geometry of a vane as a 3D point cloud. Dimensions can be extracted from the 3D point cloud by digital analysis, which can then be used to perform vane classification. The full 3D geometry provides for identification of high points on a surface of a vane more accurately than single point CMM approaches. The 3D data of the point cloud also provides for analysis with different datum schemes for engineering investigations.

Figure 2A:
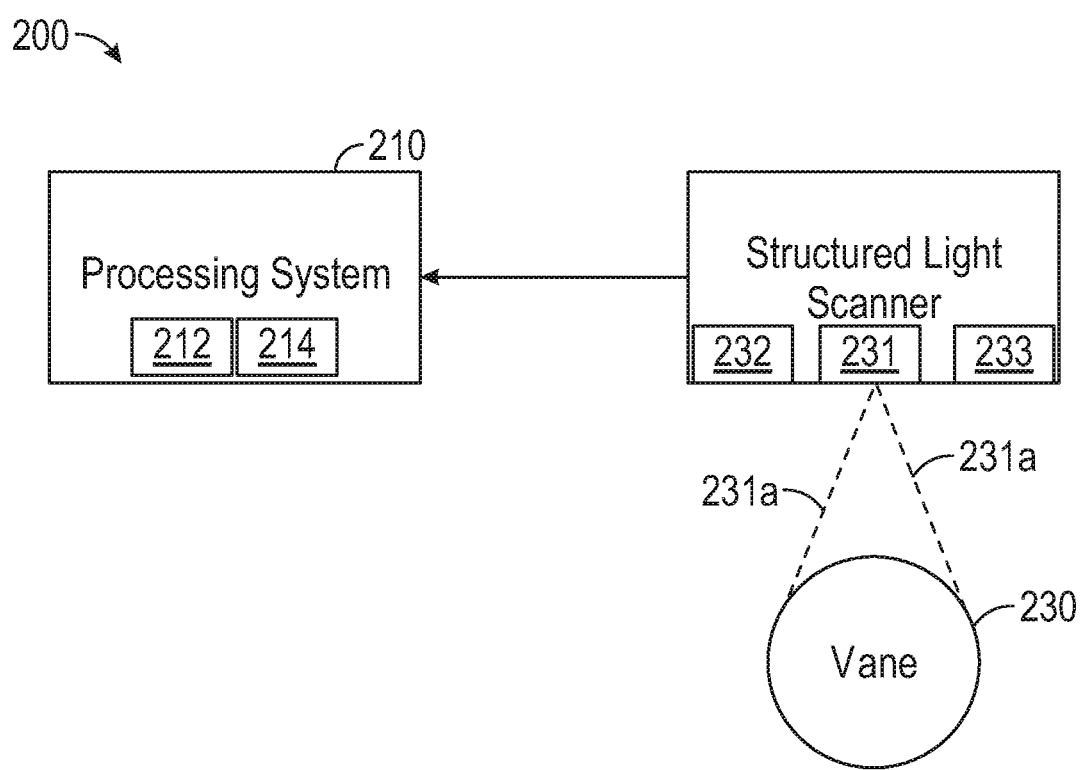
FIG. 2A is a block diagram of a system for performing vane classification according to one or more embodiments described herein.

FIG. 2 is a block diagram of a system 200 for performing vane classification according to one or more embodiments described herein. The system 200 includes a processing system 210 (e.g., the processing system 500 of FIG. 5) and a structured light scanner 220. The structured light scanner 220 can be any suitable device for projecting a light pattern onto a surface of an object to be scanned, such as a vane 230 of a turbine engine (e.g., the gas turbine engine 20). For example, the structured light scanner 220 can include a projector 231 to project a structured light pattern 231a onto the vane 230. The structured light scanner 220 can also include cameras 232, 233 to capture images of the vane 230 while the structured light pattern 231a is being projected onto the vane 230. According to an example, the structured light scanner 220 is a blue light scanner, although other types of structured light scanners can be implemented in accordance with one or more embodiments described herein.

The processing system 210 receives data about the vane 230 from the structured light scanner 220. According to an example, the structured light scanner 220 can use the images from the cameras 232, 233 to generate 3D data. According to another example, the processing system 210 receives the images from the structured light scanner 220 and uses those images to generate the 3D data. The processing system 210 can use the 3D data to generate a mesh surface and determine an airflow for the vane using the mesh surface.

The features and functionality of the system 200 can be implemented, for example, as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these and/or the like. According to aspects of the present disclosure, the features and functionality described herein can be a combination of hardware and programming. The programming can be processor executable instructions stored on a tangible memory, and the hardware can include a processing device 212 (e.g., one or more of processing devices 521 of FIG. 5 and/or the like) for executing those instructions. Thus a system memory 214 (e.g., the random access memory 524 of FIG. 5, the read only memory 522 of FIG. 5, and/or the like, including combinations and/or multiples thereof) can store program instructions that when executed by the processing device 212 implement the engines described herein. Other engines can also be utilized to include other features and functionality described in other examples herein.

Figure 2B:
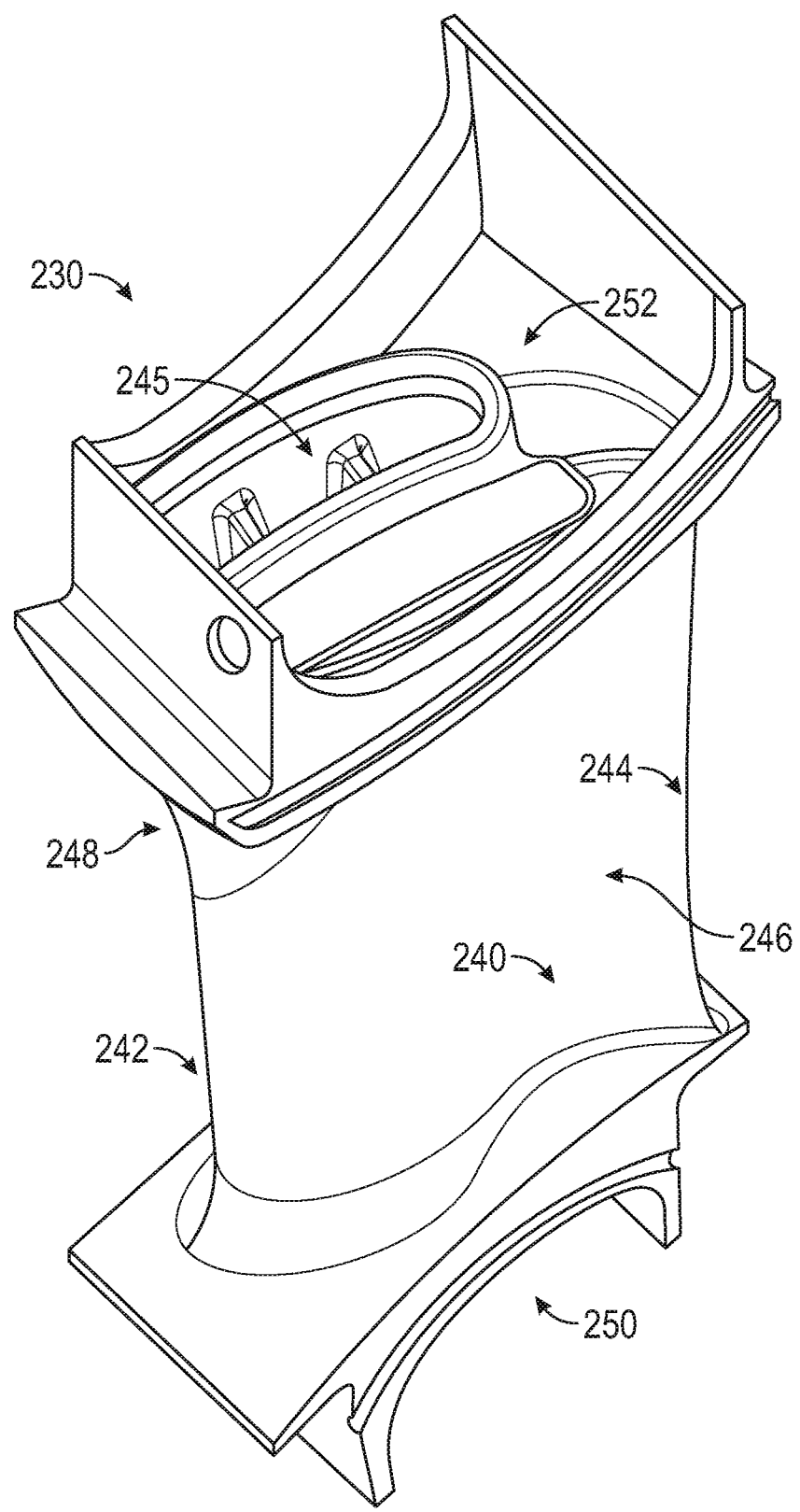
FIG. 2B depicts a vane according to one or more embodiments described herein.

FIG. 2B depicts the vane 230 according to one or more embodiments described herein. Particularly, the vane 230 is turbine vane featuring an airfoil 240 having a leading edge 242, a trailing edge 244, a pressure side 246, and a suction side 248. The vane 230 also includes an inner diameter platform 250 and an outer diameter platform 252. This particular embodiment features both an airfoil core 254 which renders the airfoil hollow and a platform core (not shown). In addition, though this figure features only an outer diameter core, the same principles can be used on the inner platform. Also note that this example features a singlet design, namely one airfoil per inner and outer platform segments. However, one or more embodiments described herein can be used on vane segments with a multiplicity of airfoils.

Figure 3:
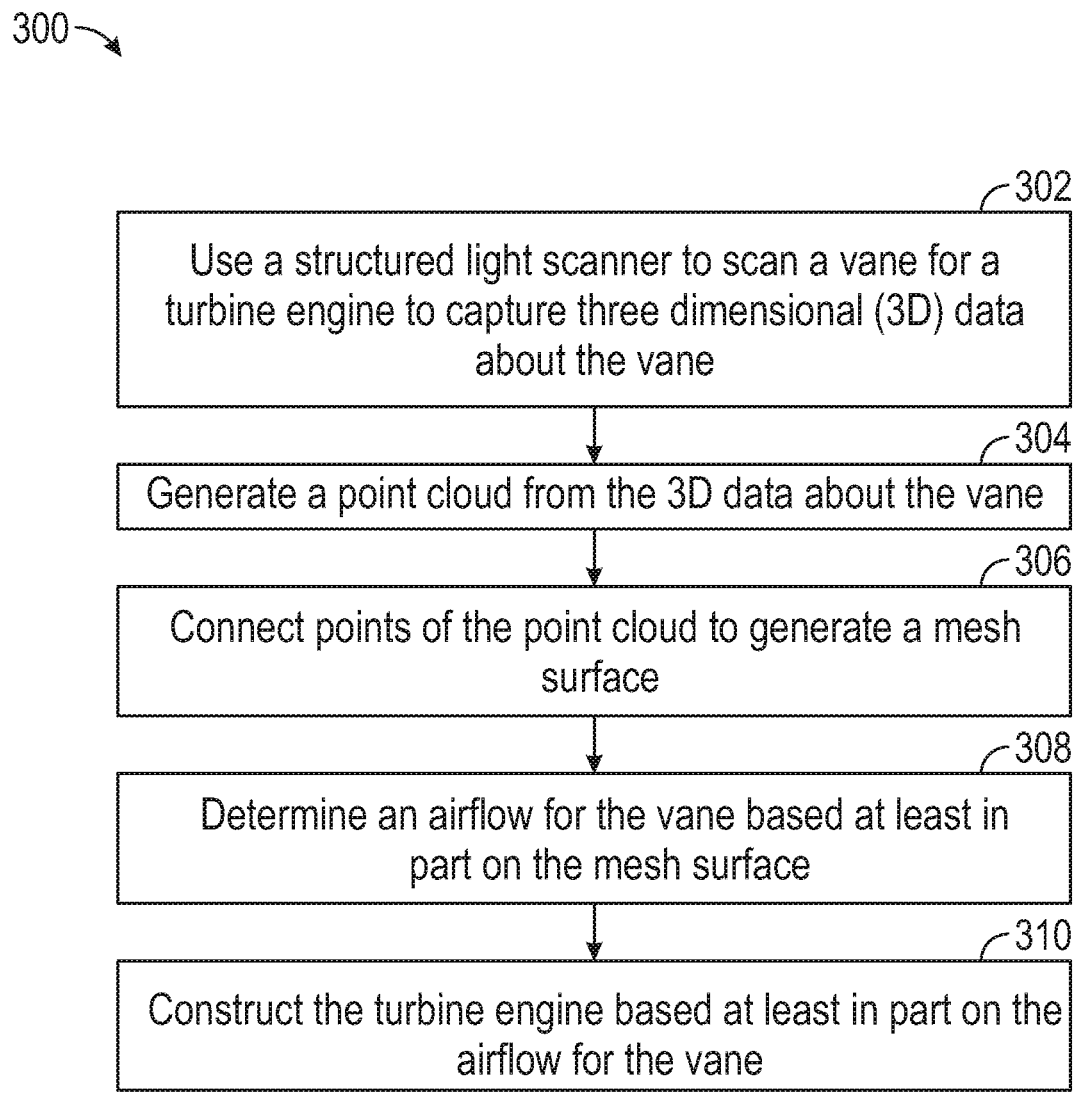
FIG. 3 is a flow diagram of a method for performing vane classification according to one or more embodiments described herein.

FIG. 3 is a flow diagram of a method 300 for performing vane classification according to one or more embodiments described herein. The method 300 can be performed using any suitable system and/or device. For example, the method 300 can be performed using the processing system 210 of FIG. 2, the processing system 500 of FIG. 5, and/or the like, including combinations and/or multiples thereof. The method 300 is now described with reference to the components of FIG. 2, but is not so limited.

At block 302, the structured light scanner 220 scans the vane 230 of a turbine engine (e.g., the gas turbine engine 20) to capture 3D data about the vane 230. At block 304, a point cloud is generated from the 3D data about the vane 230. As described herein, the structured light scanner 220 and/or the processing system 210 can generate the point cloud from the 3D data. At block 306, the processing system 210 connects points of the point cloud to generate a mesh surface. The mesh surface can be generated using a triangle mesh, a polygon mesh, and/or another suitable mesh, including combinations and/or multiples thereof.

At block 308, the processing system 210 determines an airflow for an airfoil (e.g., the airfoil 240) of the vane 230 using the mesh surface from block 306. The mesh surface provides for the processing system 210 to take measurements off the mesh surface to determine airflow of a single airfoil of the vane 230 then determine flow responsibility of that airfoil of the vane 230 to determine the airflow of that airfoil. This provides for measuring a single airfoil without reference to an adjacent airfoil. Techniques for determining the airflow for the vane 230 can include using a rectangular differential equation, a Simpson's Rule (also referred to as Simpson's ⅓ Rule), a trapezoidal rule, and/or the like, including combinations and/or multiples thereof. According to one or more embodiments described herein, the airflow is determined based at least in part on an amount of air flow blockage of the vane. According to one or more embodiments described herein, the airflow is determined based at least in part on a rotational angle of the vane. An example equation for determining the airflow is given as follows:

$$FA = SA_{SectorArea} - Blockage + \Delta RFA + X_{translated\,from\,\Delta Y}$$

where FA is the airflow, $SA_{SectorArea}$ is the total area responsible for one sector of a ring of airfoils where a portion of that sector is blocked by the airfoil and the other is not blocked, Blockage is the thickness of the airfoil along the direction of flow, $\Delta RFA$ is the change in flow area due to a change in angular direction of the airfoil relative to an engine holding point, and $X_{translated\,from\,\Delta Y}$ is the Change in the flow area due to the change in distance between the inner and outer diameter platforms.

At block 310, a turbine engine (e.g., the gas turbine engine 20) is constructed based at least in part on the airflow for the vane. For example, if the airflow for the vane indicates that the vane is out of tolerance or otherwise unsuitable for inclusion in the turbine engine (e.g., if the airflow fails to satisfy a threshold), the vane may be discarded or not used in a particular turbine engine, even though it may be suitable for another turbine engine. For example, for some engine programs, vanes are selected, sorted, and intermixed such that their combined air flow meets the airflow requirement for the engine. In some other engine programs, airflow of vanes are measured and used to alter future vanes being manufactured (e.g., adjust an aspect of vanes produced in a next batch of vanes) until the vanes produced create a flow area within a specific tolerance allowing the vanes to be fully interchangeable with other vanes made using the same tolerances. According to one or more embodiments described herein, the vane can be selected based on the airflow of other vanes included in the gas turbine engine. Or for example, vanes can be selected that have similar airflow.

It should be appreciated that the method 300 can be used to evaluate a single airfoil at a time. That is, a single vane is scanned, and each airfoil is analyzed individually for airflow.

Additional processes also may be included, and it should be understood that the process depicted in FIG. 3 represents an illustration, and that other processes may be added or existing processes may be removed, modified, or rearranged without departing from the scope of the present disclosure.

Figure 4A:
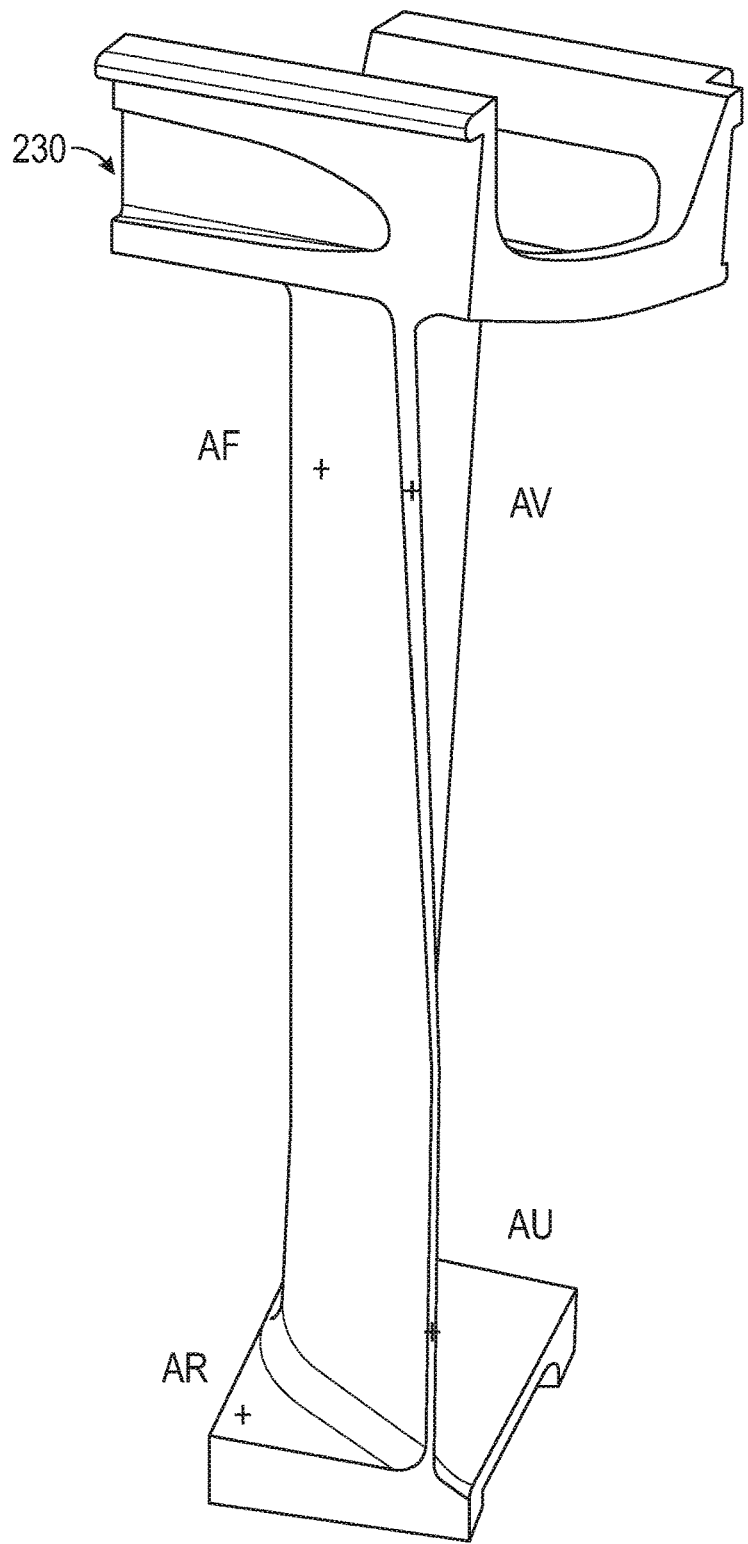
FIGS. 4A-4D depict representations of the vane of FIG. 2 according to one or more embodiments described herein.
Figure 4B:
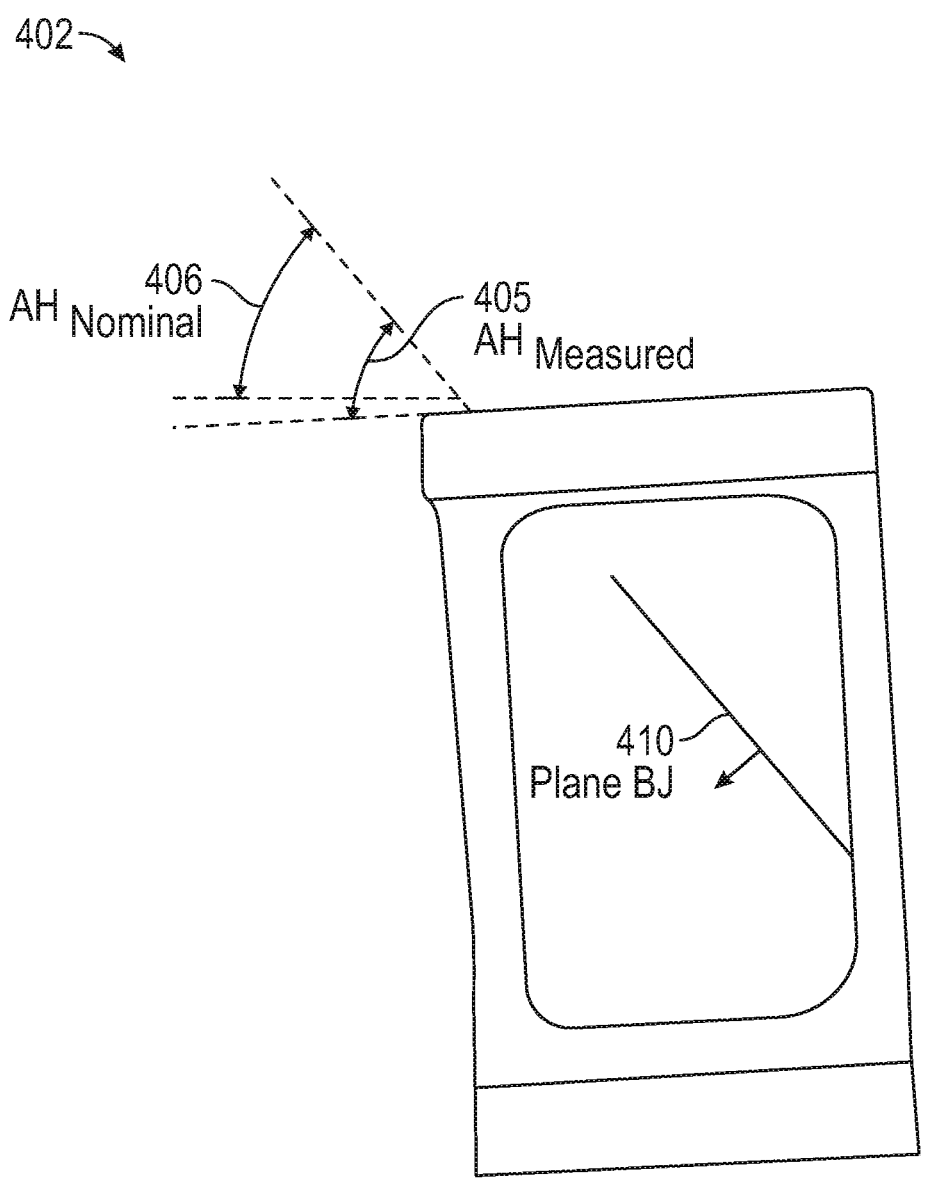
Figure 4C:
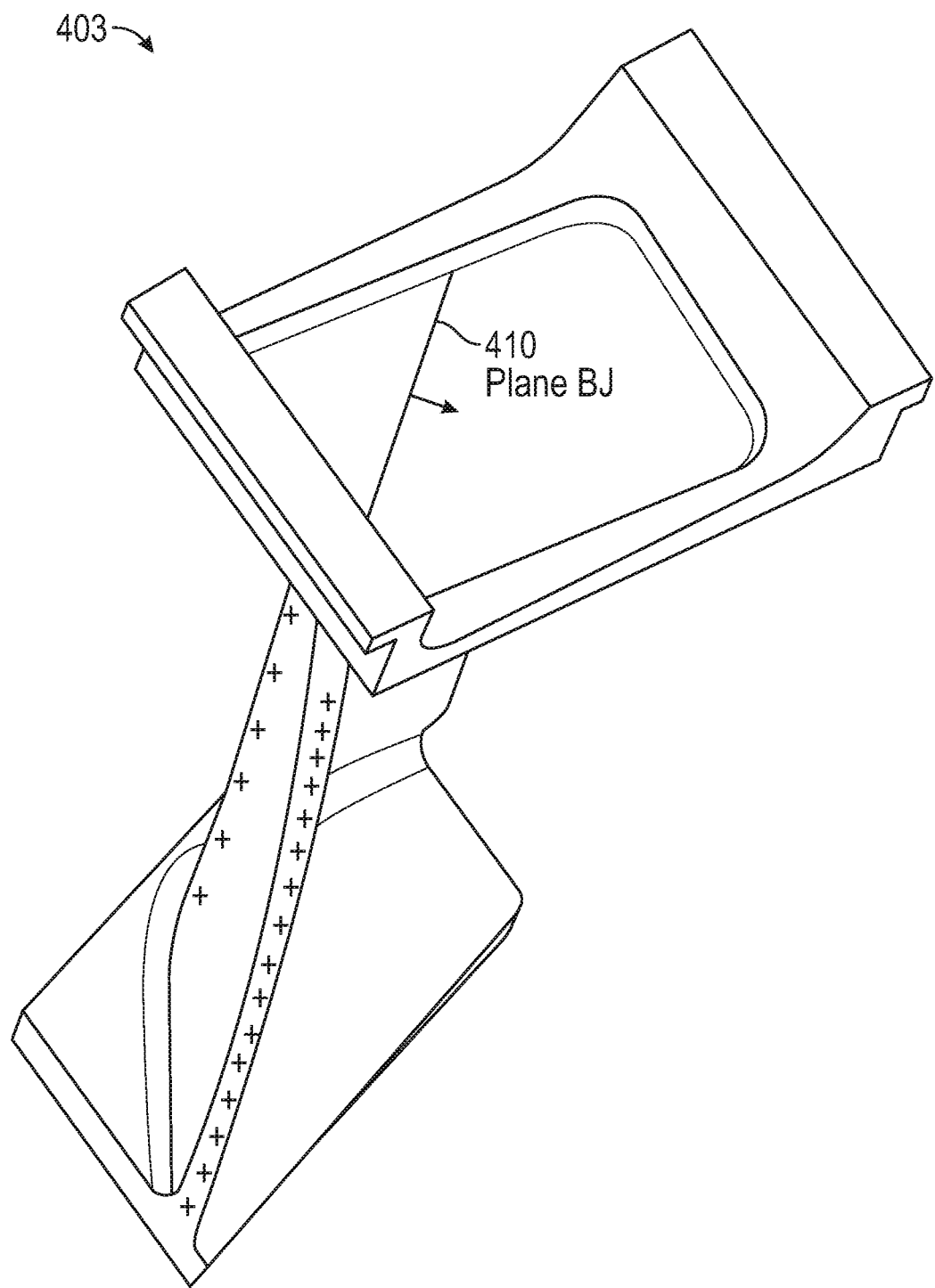
Figure 4D:
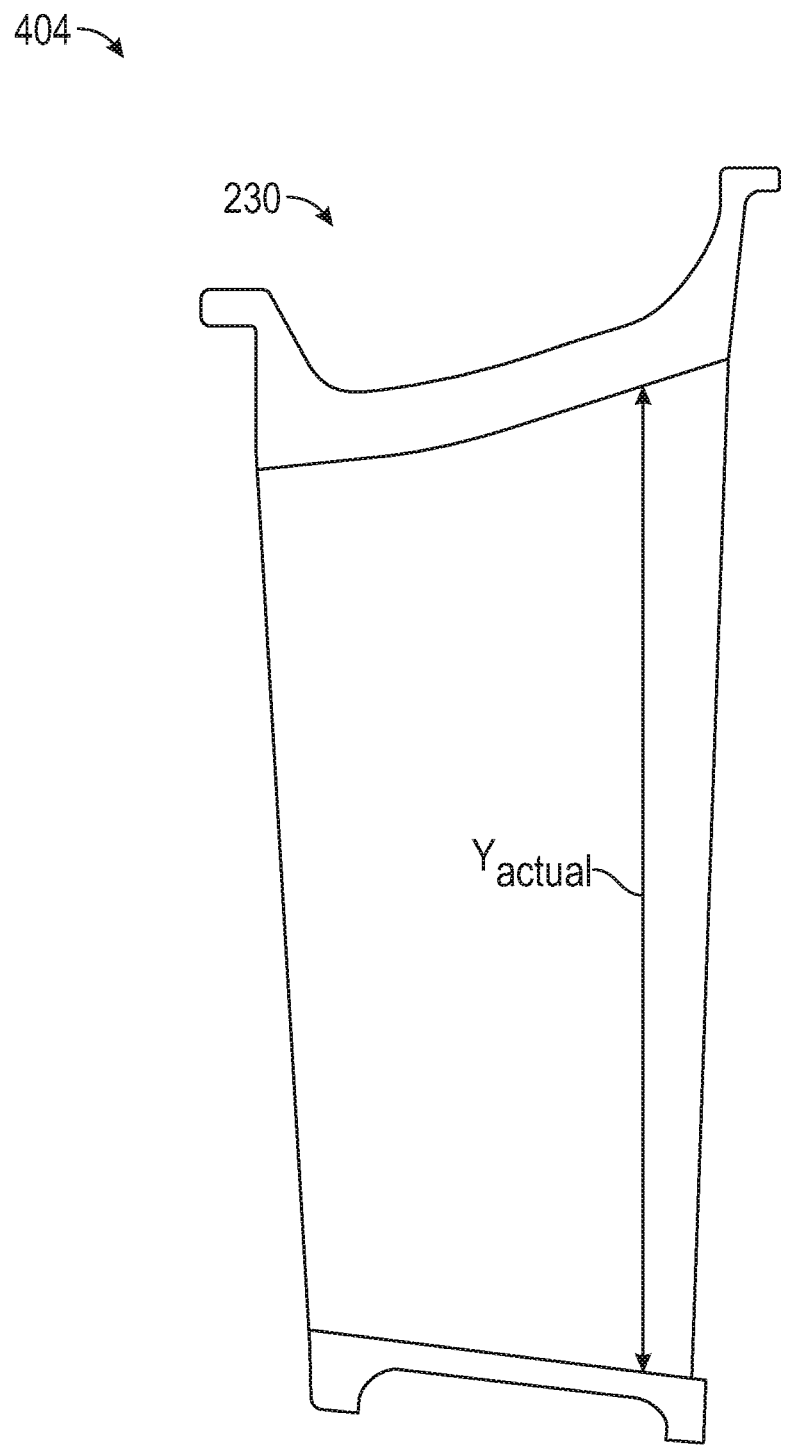

FIGS. 4A-4D depict representations 401-404 of the vane 230 according to one or more embodiments described herein. The representations 401-404 represent scans of the vane 230 according to one or more embodiments described herein. In FIG. 4A, the representation 401 shows a six-point nest alignment to establish a nominal average flow direction ("BJ"). In FIG. 4B, the representation 402 shows a measured angle 405 and a nominal angle 406. The "nominal" angle 406 represents an as designed angle AH while the "actual" measured angle 405 represent the measured angle "AH." A deviation value "dev" represents the deviation or difference between the measured and nominal angles 405, 406. That is, the deviation value, or difference between the measured and nominal angles 405, 406, equals how the airfoil (e.g., the airfoil 240) as rotated relative to how the vane 230 will sit in the engine. In FIG. 4C, the representation 403 shows how gage points for the flow direction of nominal airflow are used to extract the thickness of the airfoil in the direction of flow. The plane 410 represents the average flow direction. Gauge points (not shown) perpendicular to the direction of flow can be used to measure the blockage of the airfoil. The number of points can be equal, or not, and the number of points can be in coplanar pairs, or not, depending on the differential method used to calculate the blockage area. In FIG. 4D, the representation 404 shows how to measure $Y_{actual}$, which is a height of the airfoil as shown. The "nominal" value represents the design intent height, while the "actual" represents the measured height of the actual airfoil.

One or more embodiments described herein reduce/eliminate the infrastructure for hard gage or CMM vane calculation approaches. For example, for the techniques described herein, the vane is simply positioned, scanned, and then the processing system 210 determines airflow for the vane as described. Moreover, one or more examples described herein can scan an entire surface of a vane to get a high point, so if a choke point is not where it says it should be, a true flow area for that vane can be determined. By constructing a turbine engine using vanes classified using one or more embodiments described herein, the turbine engine is improved. Specifically, using vanes with known airflows means turbine engines can be constructed more closely to design specifications, thus improving the engine efficiency.

One or more embodiments described herein eliminate the CMM fixture requirement, provide for multiple part alignments compared to CMM single/fixtured alignment, provide for visualization of Aberrant geometry (e.g., crocked trailing edge due to hot or cold forming), provide for automated high point detection compared to CMM single point measurements, and/or the like, including combinations and/or multiples thereof.

Figure 5:
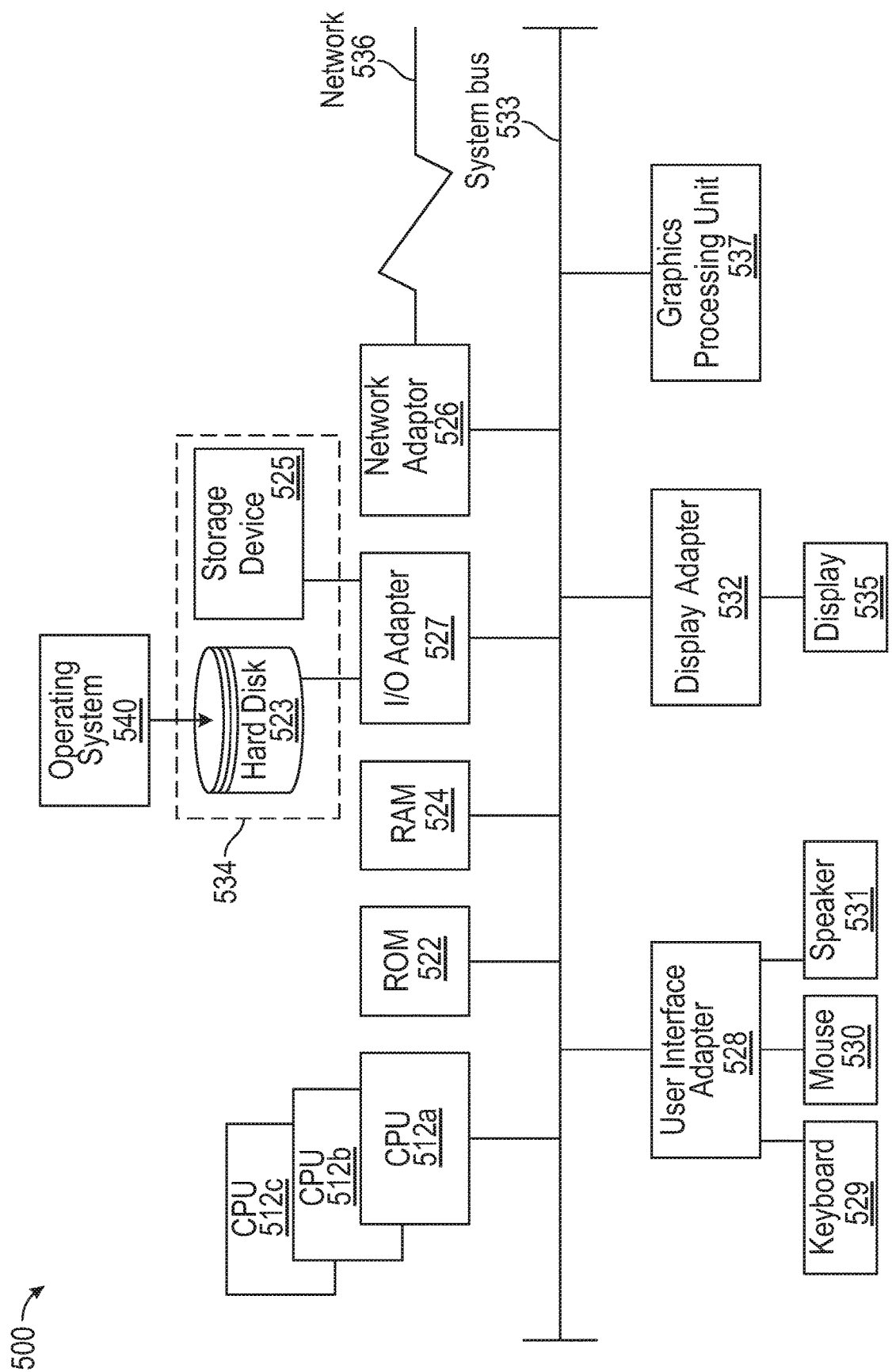
FIG. 5 is a block diagram of a processing system for implementing one or more embodiments described herein.

It is understood that one or more embodiments described herein is capable of being implemented in conjunction with any other type of computing environment now known or later developed. For example, FIG. 5 depicts a block diagram of a processing system 500 for implementing the techniques described herein. In accordance with one or more embodiments described herein, the processing system 500 is an example of a cloud computing node of a cloud computing system. In examples, processing system 500 has one or more central processing units ("processors" or "processing resources" or "processing devices") 521a, 521b, 521c, etc. (collectively or generically referred to as processor(s) 521 and/or as processing device(s)). In aspects of the present disclosure, each processor 521 can include a reduced instruction set computer (RISC) microprocessor. Processors 521 are coupled to system memory (e.g., random access memory (RAM) 524) and various other components via a system bus 533. Read only memory (ROM) 522 is coupled to system bus 533 and may include a basic input/output system (BIOS), which controls certain basic functions of processing system 500.

Further depicted are an input/output (I/O) adapter 527 and a network adapter 526 coupled to system bus 533. I/O adapter 527 may be a small computer system interface (SCSI) adapter that communicates with a hard disk 523 and/or a storage device 525 or any other similar component. I/O adapter 527, hard disk 523, and storage device 525 are collectively referred to herein as mass storage 534. Operating system 540 for execution on processing system 500 may be stored in mass storage 534. The network adapter 526 interconnects system bus 533 with an outside network 536 enabling processing system 500 to communicate with other such systems.

A display 535 (e.g., a display monitor) is connected to system bus 533 by display adapter 532, which may include a graphics adapter to improve the performance of graphics intensive applications and a video controller. In one aspect of the present disclosure, adapters 526, 527, and/or 532 may be connected to one or more I/O busses that are connected to system bus 533 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 533 via user interface adapter 528 and display adapter 532. A keyboard 529, mouse 530, and speaker 531 may be interconnected to system bus 533 via user interface adapter 528, which may include, for example, a Super I/O chip integrating multiple device adapters into a single integrated circuit.

In some aspects of the present disclosure, processing system 500 includes a graphics processing unit 537. Graphics processing unit 537 is a specialized electronic circuit designed to manipulate and alter memory to accelerate the creation of images in a frame buffer intended for output to a display. In general, graphics processing unit 537 is very efficient at manipulating computer graphics and image processing, and has a highly parallel structure that makes it more effective than general-purpose CPUs for algorithms where processing of large blocks of data is done in parallel.

Thus, as configured herein, processing system 500 includes processing capability in the form of processors 521, storage capability including system memory (e.g., RAM 524), and mass storage 534, input means such as keyboard 529 and mouse 530, and output capability including speaker 531 and display 535. In some aspects of the present disclosure, a portion of system memory (e.g., RAM 524) and mass storage 534 collectively store the operating system 540 to coordinate the functions of the various components shown in processing system 500.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for vane classification comprising:
scanning, using a structured light scanner, a vane having a singlet design including a single airfoil for a turbine engine to capture three-dimensional (3D) data about the vane,
generating a point cloud from the 3D data corresponding to the scanned vane;
connecting, using a processing system, points of the point cloud to generate a vane mesh surface of the scanned vane and an airfoil mesh surface;
determining, using the processing system, an airflow for the single airfoil without reference to an adjacent airfoil based at least in part on the vane mesh surface; and
optimizing the airflow of the turbine engine based on the airflow of the single airfoil, wherein determining the airflow for the single airfoil includes measuring the airflow of the single airfoil based on the vane mesh surface without reference to an adjacent airfoil, and wherein the airflow is determined based at least in part on an amount of air flow blockage of corresponding to the scanned vane, and wherein the turbine engine including at least one produced airflow is constructed based at least in part on the airflow for the single airfoil.

2. The method of claim 1, wherein the structured light scanner is a blue light structured light scanner.

3. The method of claim 1, wherein the mesh surface is a triangle mesh.

4. The method of claim 1, wherein the mesh surface is a polygon mesh.

5. The method of claim 1, wherein the airflow is determined based at least in part on a rotational angle of the scanned vane.

6. A system comprising:

a structured light scanner to scan a vane having a singlet design including a single airfoil for a turbine engine, the scan configured to capture three-dimensional (3D) data about the single airfoil of the vane; and a processing system comprising:
a memory comprising computer readable instructions; and
a processing device for executing the computer readable instructions, the computer readable instructions controlling the processing device to perform operations for vane classification comprising:
generating a point cloud from the 3D data corresponding to the airfoil of the vane;
connecting points of the point cloud to generate a vane mesh surface;
determining, using the processing system, an airflow for the single airfoil with without reference to an adjacent airfoil based at least in part on the vane mesh surface; and
optimizing the airflow of the turbine engine based on the airflow of the single airfoil,
wherein determining the airflow for the single airfoil includes measuring the airflow of the single airfoil based on the vane mesh surface without reference to an adjacent airfoil, and wherein the airflow is determined based at least in part on an amount of air flow blockage of corresponding to the scanned vane, and
wherein the turbine engine is constructed based at least in part on the airflow determined according to the single airfoil.

7. The system of claim 6, wherein the structured light scanner is a blue light structured light scanner.

8. The system of claim 6, wherein the mesh surface is a triangle mesh.

9. The system of claim 6, wherein the mesh surface is a polygon mesh.

10. The system of claim 6, wherein the airflow is determined based at least in part on a rotational angle of the vane.

11. The system of claim 6, wherein the structured light scanner scans a gas path of the turbine engine for a window height, wherein determining the airflow for the airfoil of the vane is based at least in part on the window height.

12. A computer program product comprising a computer readable storage medium having program instructions embodied therewith, the program instructions executable by a processor to cause the processor to perform operations comprising:

receiving, from a structured light scanner, three-dimensional (3D) data about a vane and a gas path for the vane, the vane having a singlet design including a single airfoil for a turbine engine, generating a point cloud from the 3D data corresponding to the airfoil and the gas path of the vane;

connecting, using a processing system, points of the point cloud to generate a vane mesh surface;

determining, using the processing system, an airflow for the single airfoil without reference to an adjacent airfoil based at least in part on the vane mesh surface; and optimizing the airflow of the turbine engine based on the airflow of the single airfoil, wherein determining the airflow for the single airfoil includes measuring the airflow of the single airfoil based on the vane mesh surface without reference to an adjacent airfoil, and wherein the airflow is determined based at least in part on an amount of air flow blockage of corresponding to the scanned vane, and wherein the turbine engine including at least one produced airflow is constructed based at least in part on the airflow for the single airfoil.

13. The computer program product of claim 12, wherein the structured light scanner is a blue light structured light scanner.

14. The computer program product of claim 12, wherein the mesh surface is a polygon mesh.

15. The computer program product of claim 12, wherein the airflow is determined based at least in part on a rotational angle of the vane.

* * * * *